United States Patent
Liang et al.

(10) Patent No.: US 12,306,645 B2
(45) Date of Patent: May 20, 2025

(54) CONTROL METHOD AND CONTROL SYSTEM FOR HIGH-PRECISION RAPID TEMPERATURE TRAJECTORY TRACKING

(71) Applicant: South China University of Technology, Guangzhou (CN)

(72) Inventors: Fulin Liang, Guangzhou (CN); Shouqiang Qiu, Xuzhou (CN)

(73) Assignee: South China University of Technology, Guangzhou (CN)

( * ) Notice: Subject to any disclaimer, the term of this patent is extended or adjusted under 35 U.S.C. 154(b) by 441 days.

(21) Appl. No.: 17/990,123

(22) Filed: Nov. 18, 2022

(65) Prior Publication Data

US 2023/0229180 A1    Jul. 20, 2023

(30) Foreign Application Priority Data

Jan. 18, 2022   (CN) .......................... 202210055133.3

(51) Int. Cl.
  *G05D 23/19*   (2006.01)
  *G01K 3/10*   (2006.01)

(52) U.S. Cl.
  CPC ........... *G05D 23/1917* (2013.01); *G01K 3/10* (2013.01)

(58) Field of Classification Search
  None
  See application file for complete search history.

(56) References Cited

U.S. PATENT DOCUMENTS

2016/0107526 A1*  4/2016  Jin .......................... B60L 7/10
                                                       307/10.1
2020/0176989 A1*  6/2020  Zhang .................... B01J 19/087

* cited by examiner

*Primary Examiner* — Mohammad Ali
*Assistant Examiner* — Saad M Kabir
(74) *Attorney, Agent, or Firm* — Hemisphere Law, PLLC; Zhigang Ma

(57) ABSTRACT

A control method and a control system for temperature trajectory tracking are provided. The method includes: drawing a target temperature trajectory, discretizing the target temperature trajectory, and performing temperature trajectory control based on the discretized target temperature trajectory. The system includes a preset temperature trajectory processor for drawing a target temperature trajectory, a controlled object for characterizing an actual temperature, a platinum resistance sensor for detecting the actual temperature of the controlled object and inputting the actual temperature into a controller, and the controller for drawing an actual temperature trajectory, discretizing the target temperature trajectory, and operating a PID control program to complete temperature trajectory control. The traditional static constant temperature control can be realized, and close tracking of a preset temperature process trajectory in a second-level time level can be realized, thereby meeting requirements of application occasions with strict requirements on temperature change processes in a short time.

4 Claims, 2 Drawing Sheets

CONTROL METHOD AND CONTROL SYSTEM FOR HIGH-PRECISION RAPID TEMPERATURE TRAJECTORY TRACKING

TECHNICAL FIELD

The disclosure relates to the field of temperature trajectory tracking control technologies, and more particularly to a control method and a control system for high-precision rapid temperature trajectory tracking.

BACKGROUND

Temperature control technology is more and more widely used in various fields, such as boiler heating in the industrial field, precise temperature control of a computer numerical control (CNC) lathe, constant temperature storage of vaccines and drugs, and constant temperature storage of foods in refrigerators and cold storage. However, at present, the widely used temperature control technology is based on a static control mode, that is, after a target temperature is set, a controlled object is in a constant temperature state. This is a traditional temperature control method, the technology development has been very mature, the control accuracy is also very high, and it has achieved very satisfactory effects in many occasions.

With the rapid development of economy, requirements for temperature control are getting higher and higher, especially for constant temperature accuracy, which even reaches ±0.01° C. In addition to the higher and higher requirements for accuracy, the demand for rapid dynamic tracking control of temperature is also increasingly reflected. Some special chemical reactions, the processing process of some precise machine parts, and the processing process of food, such as the baking of tea and coffee beans, require that the temperature should be changed according to a preset trajectory instead of the traditional constant temperature mode, that is, the target temperature is a trajectory changing with time, and the change speed reaches a second level. In view of the above-mentioned requirements for temperature control, a control method capable of quickly tracking a preset temperature trajectory is provided in the disclosure, and precisely tracking heating or cooling temperature process trajectory within a second response time.

In addition, the temperature change process of the controlled object often appears overshoot when a target value is reached for the first time, which is not conducive to effects of the temperature control.

SUMMARY

According to a control method of temperature provided by the disclosure, a non-overshoot temperature change process is realized, discretization processing is performed on a target temperature trajectory, and then tracking of the target temperature trajectory is realized by combining the non-overshoot temperature control method. A temperature control device implemented by the control method of the disclosure can quickly and precisely track a preset temperature trajectory, thereby satisfying special requirements of the controlled object on the temperature change process.

In one aspect, in order to achieve the above purpose, the disclosure provides a control method for high-precision rapid temperature trajectory tracking, including the following steps:

drawing a target temperature trajectory of a controlled object, performing discretization processing on the target temperature trajectory to obtain a discretized target temperature trajectory, and performing temperature trajectory control on the controlled object based on the discretized target temperature trajectory.

In an embodiment, the performing temperature trajectory control includes:
taking a first point of the target temperature trajectory as a pre-heating temperature value or a pre-cooling temperature value, and starting the temperature trajectory control after a temperature of the controlled object reaches the pre-heating temperature value or the pre-cooling temperature value.

In an embodiment, the drawing a target temperature trajectory includes:
acquiring target temperature points, and connecting the target temperature points to draw the target temperature trajectory.

In an embodiment, the performing discretization processing on the target temperature trajectory includes:
determining whether a time interval between adjacent target temperature points in the target temperature trajectory is greater than one second;
dividing, in response to the time interval between the adjacent target temperature points in the target temperature trajectory being greater than one second, a connecting line between the adjacent target temperature points into n parts equally by taking one second as an interval, acquiring a temperature increment through equally dividing a temperature difference value between the adjacent target temperature points into the n parts, and obtaining n numbers of target temperature values based on a starting point temperature of the connecting line between the adjacent target temperature points with a difference of each adjacent two target temperature values of the n numbers of target temperature values being the temperature increment, thereby completing discrete subdivision of the connecting line between the adjacent target temperature points; and
performing the discrete subdivision on all the adjacent target temperature points in the target temperature trajectory, thereby completing the discretization processing of the target temperature trajectory.

In an embodiment, the performing temperature trajectory control further includes:
acquiring an actual temperature trajectory of the controlled object, and processing the actual temperature trajectory when the actual temperature trajectory deviates from the discretized target temperature trajectory, then replacing the target temperature trajectory with the processed actual temperature trajectory.

In an embodiment, the processing the actual temperature trajectory includes:
after the actual temperature trajectory deviates from the discretized target temperature trajectory, acquiring a transition temperature point when the actual temperature trajectory recovers a same trend as the target temperature trajectory, and acquiring a temperature difference value within a preset threshold range based on the transition temperature point; wherein the preset threshold range is a range from a time sequence number of the transition temperature point to one of time sequence numbers taken 1.5 to 2.5 times of the time sequence number of the transition temperature point, and the time sequence number is one of abscissa sequence numbers sequentially marked when the n numbers of target temperature values are increased in one-by-one manner by the time interval of one second in the discretized target temperature trajectory;

acquiring, based on the temperature difference value within the preset threshold range, an average temperature difference value of temperature points varying in one-by-one manner by the time interval of one second within the preset threshold range; and adding the average temperature difference value to temperature values of the temperature points in one-by-one manner by the time interval of one second based on the transition temperature point to thereby obtain the processed actual temperature trajectory.

In another aspect, in order to achieve the above purpose, the disclosure provides a control system for high-precision rapid temperature trajectory tracking, including a controller, a servo fan, a heating wire, a platinum resistance sensor, the controlled object, and a preset temperature trajectory processor (also referred to as a preset temperature trajectory module). The preset temperature trajectory module is configured to draw a target temperature trajectory. The platinum resistance sensor is configured to detect an actual temperature of the controlled object and input the actual temperature to the controller. The controller is configured to control a wind speed of the servo fan and a power output of the heating wire based on the actual temperature, draw an actual temperature trajectory based on the actual temperature, perform discretization processing on the target temperature trajectory, and operate a proportional-integral-derivative (PID) control program thereby completing temperature trajectory control.

In an embodiment, parameters of the PID control program are obtained by self-tuning by a relay feedback method, and the parameters of the PID control program include a proportional coefficient Gain, an integral time Ti, a derivative time Td.

Compared with the related art, the disclosure has advantages and technical effects as follows.

The non-overshoot control of temperature during heating or cooling process can be realized by operating the PID control program, the target temperature trajectory is performed with discretization processing to realize rapid close tracking control within the second-level time, and the deviation of the actual trajectory in the process of tracking and controlling the target temperature trajectory can be quickly corrected without overshoot. The controller designed by the control method provided by the disclosure can realize precise temperature control on some special chemical reactions, drug manufacturing and the like which need to be strictly carried out according to the preset temperature trajectory, and also can realize precise temperature trajectory control on some food processing processes, cooking processes, baking processes and the like which need to be strictly carried out according to the preset temperature trajectory, so that better product quality is obtained.

BRIEF DESCRIPTION OF DRAWINGS

The accompanying drawings, constituting a part of the disclosure, are used to provide a further understanding of the disclosure, illustrative embodiments of the disclosure and the description thereof are for the purpose of explanation, and are not intended to unduly limit the disclosure.

DETAILED DESCRIPTION OF EMBODIMENTS

Figure 1:
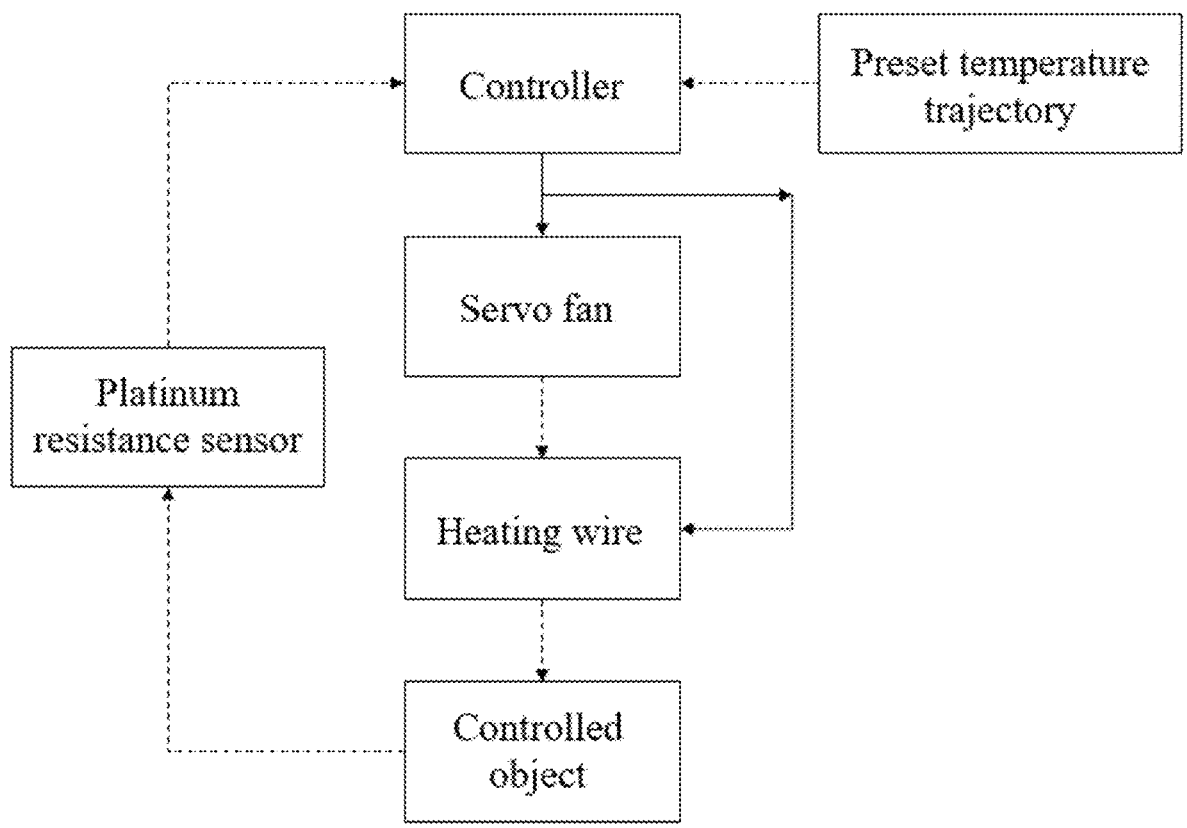
FIG. 1 illustrates a schematic structural diagram of a control system for high-precision rapid temperature trajectory tracking according to an embodiment 1 of the disclosure.

It should be noted that embodiments in the disclosure and features in the embodiments may be combined with each other without conflict. The disclosure will be described in detail below with reference to the accompanying drawings and in combination with the embodiments.

It should be noted that blocks illustrated in the flowchart of the accompanying drawings may be implemented in a computer system, such as a set of computer-executable instructions, although a logical sequence is shown in the flowchart, in some cases, the illustrated or described blocks may be implemented in a different order than herein.

The disclosure provides a control method for high-precision rapid temperature trajectory tracking, including the following steps:

drawing a target temperature trajectory of a controlled object, performing discretization processing on the target temperature trajectory to obtain a discretized target temperature trajectory, and performing temperature trajectory control on the controlled object based on the discretized target temperature trajectory.

The step of the performing temperature trajectory control includes: taking a first point of the target temperature trajectory as a pre-heating temperature value or a pre-cooling temperature value, and starting the temperature trajectory control after a temperature of the controlled object reaches the pre-heating temperature value or the pre-cooling temperature value.

The step of the drawing a target temperature trajectory includes: acquiring target temperature points, and connecting the target temperature points to draw the target temperature trajectory.

The step of the performing discretization processing on the target temperature trajectory includes: determining whether a time interval between adjacent target temperature points in the target temperature trajectory is greater than one second;

dividing, in response to the time interval between the adjacent target temperature points in the target temperature trajectory being greater than one second, a connecting line between the adjacent target temperature points into n parts equally by taking one second as an interval, acquiring a temperature increment through equally dividing a temperature difference value between the adjacent target temperature points into the n parts, and obtaining n numbers of target temperature values based on a starting point temperature of the connecting line between the adjacent target temperature points with a difference of each adjacent two target temperature values of the n numbers of target temperature values being the temperature increment, thereby completing discrete subdivision of the connecting line between the adjacent target temperature points; and performing the discrete subdivision on all the adjacent target temperature points in the target temperature trajectory, thereby completing the discretization processing of the target temperature trajectory.

The step of the performing temperature trajectory control further includes: acquiring an actual temperature trajectory, and processing the actual temperature trajectory when the actual temperature trajectory deviates from the discretized target temperature trajectory, then replacing the target temperature trajectory with the processed actual temperature trajectory.

The step of the processing the actual temperature trajectory includes: recording a transition temperature point when the actual temperature trajectory recovers a same trend as the target temperature trajectory, and acquiring a temperature difference value within a preset threshold range based on the transition temperature point, the preset threshold range being a range from a time sequence number of the transition temperature point to one of time sequence numbers taken 1.5 to 2.5 times of the time sequence number of the transition temperature point; and the time sequence number being one of abscissa sequence numbers sequentially marked when the n numbers of target temperature values are increased in one-by-one manner by the time interval of one second in the discretized target temperature trajectory;

the preset threshold range depending on the target temperature trajectory before the discretization processing, and when a slope of a connecting line of a point being adjacent to the transition temperature point of the target temperature trajectory before the discretization processing and the transition temperature point is less than a minimum slope value min, a preset threshold value being a sequence number taken 1.5 times of the sequence number of the transition temperature point from the transition temperature point as the starting point;

when the slope of the connecting line of the point being adjacent to the transition temperature point of the target temperature trajectory before the discretization processing and the transition temperature point is greater than a maximum slope value max, the preset threshold value being a sequence number taken 2.5 times of the sequence number of the transition temperature point from the transition temperature point as the starting point;

when the slope of the connecting line of the point being adjacent to the transition temperature point of the target temperature trajectory before the discretization processing and the transition temperature point is within numerical values of min and the max, times, taken the sequence number of the transition temperature point as the starting point, of the preset threshold value is obtained by performing linear interpolation based on point A (min, 1.5), point B (max, 2.5) and the slope of the target trajectory. The minimum slope value and the maximum slope value are also referred to as a minimum allowable slope and a maximum allowable slope, set by a user, and set according to a maximum power allowed by an implementation device.

acquiring, based on the temperature difference value within the preset threshold range, an average temperature difference value of temperature points varying in one-by-one manner by the time interval of one second within the preset threshold range; and adding the average temperature difference value to temperature values of the temperature points in one-by-one manner by the time interval of one second based on the transition temperature point to thereby obtain the processed actual temperature trajectory.

A control system for high-precision rapid temperature trajectory tracking, including a controller, a servo fan, a heating wire, a platinum resistance sensor, a controlled object, and a preset temperature trajectory processor (also referred to as a preset temperature trajectory module).

The preset temperature trajectory module is configured to draw a target temperature trajectory.

The controlled object is a cavity for characterizing an actual temperature.

The platinum resistance sensor is configured to detect the actual temperature of the controlled object and input the actual temperature to the controller.

The controller is configured to control a wind speed of the servo fan and a power output of the heating wire based on the actual temperature, draw the actual temperature trajectory based on the actual temperature, perform discretization processing on the target temperature trajectory, operate a proportional-integral-derivative (PID) control program thereby completing temperature trajectory control.

Specifically, parameters of the PID control program are obtained by self-tuning by a relay feedback method, and the parameters of the PID control program include a proportional coefficient Gain, an integral time Ti, and a derivative time (also referred to as differential time) Td.

Embodiment 1

Specifically, as shown in FIG. 1, the embodiment provides a control system for high-precision rapid temperature trajectory tracking, including a controller, a servo fan, a heating wire, a platinum resistance sensor, a controlled object, and a preset temperature trajectory processor (also referred to as a preset temperature trajectory module). The controller includes a microprocessor, a memory, a digital-to-analog converter, a BLUETOOTH communication circuit, a pulse width modulation (PWM) generator, a silicon-controlled rectifier, and a power supply circuit. The servo fan includes a driving circuit and a fan. The preset temperature track module is an application (APP) of a mobile device. The platinum resistor temperature sensor is a PT100 temperature sensor. The controlled object is a cavity.

The controller is a kind of microprocessor and can perform temperature detection, process data of the target temperature trajectory, operate a program programmed by the control method proposed in the disclosure, control the wind speed of the servo fan and control the power output of the heating wire by programming. The controller operates a PID control program, and a proportional coefficient Gain, an integral time Ti, and a derivative time Td of the PID control program are obtained by self-tuning by a relay feedback method. An air volume generated by the servo fan is changed into heated air (also referred to as hot wind) through the heating wire, and then the temperature of the controlled object is changed through the hot air. When the power output of the heating wire is zero, the air volume generated by the servo fan reaches the controlled object to be normal temperature air (also referred to as room temperature air), and the normal temperature air has a cooling effect on the controlled object in the heating process. The heating wire is controlled by the controller to output different levels of power to generate different levels of heat, and then the servo fan generates different levels of air volume to transfer the heat of the heating wire to the cavity of the controlled object. The platinum resistance sensor detects and inputs an actual temperature of the cavity of the controlled object to the controller, and the controller adjusts the output power of the heating wire and the air volume of the servo fan according to the detected temperature through the control method proposed in the disclosure.

Figure 2:
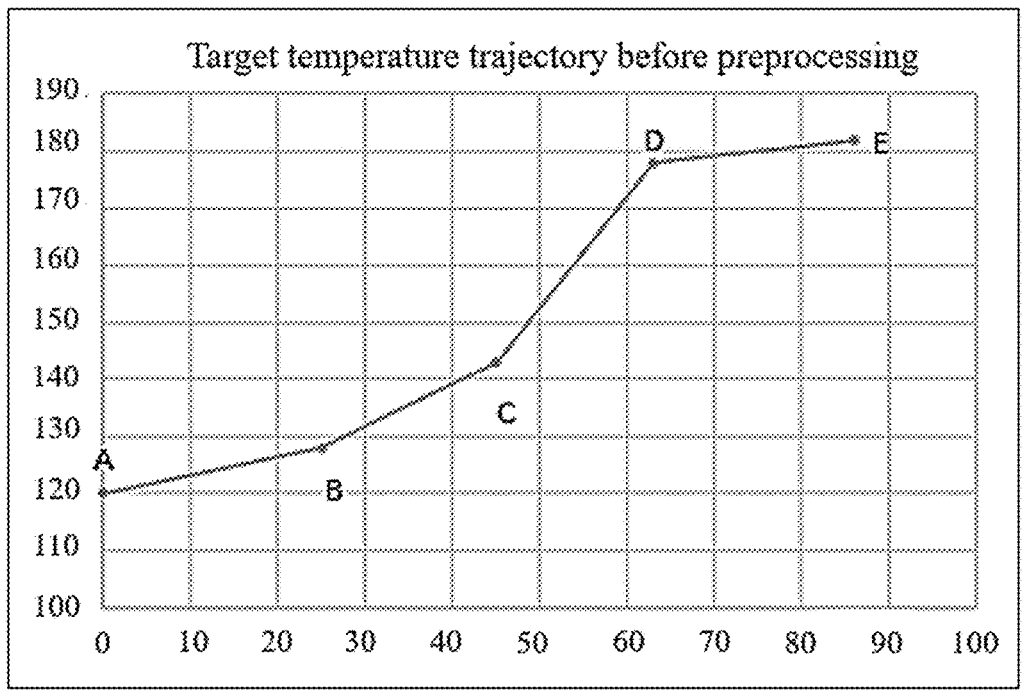
FIG. 2 illustrates a schematic diagram of a target temperature trajectory before discretization processing according to the embodiment 1 of the disclosure.
Figure 3:
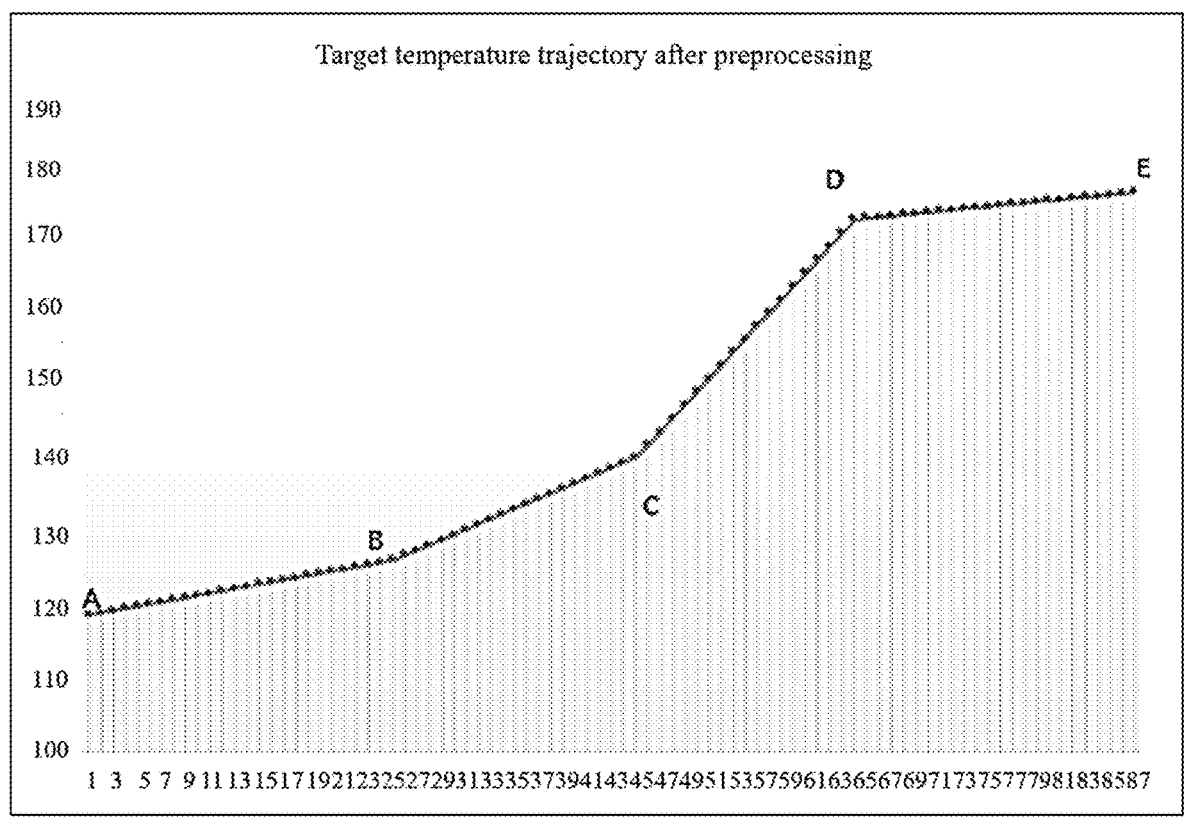
FIG. 3 illustrates a schematic diagram of a target temperature trajectory after the discretization processing according to the embodiment 1 of the disclosure.

The preset temperature trajectory module is the APP of the mobile device, the target temperature trajectory of the controlled object is set by the APP of the mobile device, then the target temperature trajectory of the controlled object is transmitted to the BLUETOOTH communication circuit of the controller by BLUETOOTH communication, and then temperature trajectory preprocessing is performed by the controller. FIG. 2 illustrates a target temperature trajectory drawn by the preset temperature trajectory module, that is, a target temperature trajectory before discretization processing, the target temperature trajectory is drawn by connecting five target temperature points, an ordinate of the target temperature trajectory is a temperature value in degrees Celsius, an abscissa of the target temperature trajectory is a relative time in seconds. After the target temperature trajectory is transmitted to the controller by BLUETOOTH communication, the discretization processing is started by the controller. The minimum time interval between two points of the target temperature trajectory is one second, and the time increment is an integer second. After the trajectory drawing is completed, the target temperature trajectory is transmitted to the memory of the controller, and the controller determines that the time interval between two points in the trajectory is greater than one second, the discretization processing is performed. A specific discretization processing process includes steps as follows. The time of target temperatures of a front point A and a rear point B is equally divided into n parts by taking one second as an interval, then a temperature difference value between the point B and the point A is equally divided by n to obtain a temperature increment $\Delta T$, and then n numbers of target temperature values are obtained based on the temperature of the point A of the connecting line between the adjacent target temperature points with a difference of each adjacent two target temperature values of the n numbers of target temperature values being the temperature increment $\Delta T$, thereby a segment of trajectory of the AB connection is divided into n numbers of target temperatures, where the time interval between each adjacent target temperatures of then numbers of target temperature is one second. Other line segments such as BC, CD, DE of the target temperature trajectory are performed with discretization subdivision according to the method of the specific discretization processing. Finally, the target temperature trajectory formed continuously by multiple line segments is subdivided into a series of discrete target values, and the time interval between each of adjacent target values is one second. FIG. 3 illustrates a new trajectory after the discretization processing is performed on the target temperature trajectory, abscissa numbers are sequentially marked by increasing the time interval of one second between each of adjacent target temperatures, and temperature points in the new trajectory as target values are input to the PID control program in the controller one by one per second according to the time sequence.

The point A of the target temperature trajectory is taken as a control starting point, the controller receives the target temperature trajectory transmitted by the preset temperature trajectory module and performs discretization processing on the target temperature trajectory, then the controller starts to operate the PID control program set by the relay feedback method, and the temperature value of the point A is used as the target value to perform pre-heating control. After the temperature of the controlled object reaches the temperature of the point A, the program in the controller starts to take temperature values of the processed target temperature trajectory as set values of the PID control program one by one per second, and the controller operates the PID control program.

Figure 4:
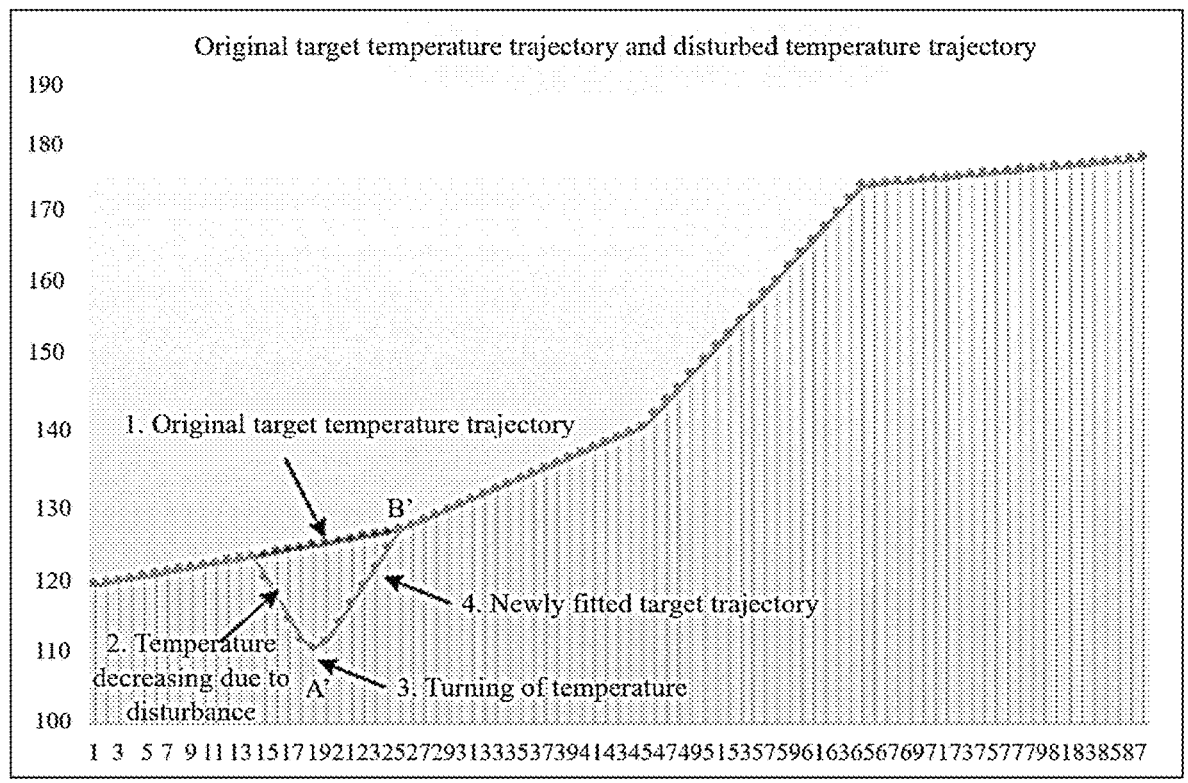
FIG. 4 illustrates a schematic diagram of an original temperature trajectory and a disturbed temperature trajectory according to the embodiment 1 of the disclosure.

The actual temperature trajectory of the cavity of the controlled object deviates from the target temperature trajectory due to external disturbance, and the temperature shows a downward trend in the heating process as shown in FIG. 4. In a temperature decreasing stage marked by the reference sign 2 in FIG. 4, when the target temperature points are input into the PID control program one by one per second as the set values, the target temperature values input one by one per second are replaced with actual temperatures, but the sequence number of the target temperature point is updated once per second until the downward trend of temperature is inverted, and the inverted sequence number of the target temperature point is recorded at this time. A temperature value of a sequence number point corresponding to the inverted sequence number is taken as the point A', a target temperature value corresponding to a sequence number point taken forwards by 1.5-2.5 times of the sequence number point of the point A' is taken as the point B', and a temperature difference value of the points B' and A' is calculated. An average temperature difference value $\Delta T$' is obtained by dividing the temperature difference value of the points B' and A' by a total number of interval segments of sequence number points between the points B' and A', that is, dividing the temperature difference value of the points B' and A' by a difference value of a sequence number corresponding to the point B' and a sequence number corresponding to the point A'. Then, the temperature value of the point A' is taken as the starting point to gradually increase the average temperature difference value $\Delta T$' one by one according to the time interval of one second, so that a new subdivided temperature trajectory is obtained, that is, a newly fitted target trajectory marked by the reference sign 4 in FIG. 4, and then the new segment of target trajectory is used as set values of the PID control program in the controller once per second.

Embodiment 2

Specifically, the embodiment provides a control method for high-precision rapid temperature trajectory tracking, the process of the control method includes discretization processing of a target temperature trajectory, self-tuning of PID parameters, pre-heating or pre-cooling stages before starting control, and processing of disturbance in a temperature trajectory tracking process. The target temperature trajectory may be a continuous curve drawn by a touch screen of a mobile phone APP or a controller, or a curve formed by connecting target temperature points input through a keyboard, the curve is used as a trajectory of the target temperature, the minimum time interval between two points when the curve is drawn is one second, and time increment is an integer second. After the trajectory drawing is completed, the trajectory is transmitted to a memory of the controller, and the program of the controller determines that the minimum interval between the two points in multiple points connected to the trajectory is greater than one second, preprocessing is performed. The specific treatment process of the preprocessing includes steps as follows. The time of target temperatures of a front point A and a rear point B is equally divided into n parts by taking one second as an interval, then a temperature difference value between the point B and the point A is equally divided by n to obtain a temperature increment ΔT, and then n numbers of target temperature values are obtained based on the temperature of the point A of the connecting line between the adjacent target temperature points with a difference of each adjacent two target temperature values of the n numbers of target temperature values being the temperature increment ΔT, thereby a segment of trajectory of the AB connection is divided into n numbers of target temperatures, where the time interval between each adjacent target temperatures of the n numbers of target temperature is one second. Other line segments such as BC, CD, DE of the target temperature trajectory are performed with discretization subdivision according to the method of the specific discretization processing. Finally, the target temperature trajectory formed continuously by multiple line segments is subdivided into a series of discrete target values, and the time interval between each of adjacent target values is one second.

The control method proposed in the disclosure is an extended application based on PID control, therefore, a stable PID controller with a relatively small overshoot and fast response needs to be realized firstly, in this situation, a set of optimized PID parameters need to be set, and the parameters are obtained by self-tuning by using a relay feedback method widely applied at present. After the optimized PID parameters are obtained, a Smith compensator is added to perform Smith compensation on the set values of the PID controller, so that the overshoot of the PID is further reduced, and no-overshoot control is realized.

Before the temperature trajectory tracking is started, a first point of the temperature trajectory is used as a target temperature for pre-heating or pre-cooling, the PID controller with the set optimal parameters is used for pre-heating or pre-cooling control. After the controlled object reaches the pre-heating or pre-cooling temperature, the series of target temperature points subjected to discrete subdivision on the temperature trajectory according to the disclosure are input to the PID controller once per second in one-by-one manner according to the time sequence as the set values, and then dynamic temperature control is started to realize trajectory tracking.

In the trajectory tracking process, when the actual trajectory of the controlled object deviates from the target trajectory, the deviation correction processing needs to be performed. When the actual temperature deviates from the target temperature, a trend of the actual temperature change process is determined. When the system is in the downward trend of actual temperature during the heating process, the target temperature values input one by one per second are replaced with actual temperatures when the target temperature points are input into the PID control program one by one per second as the set values, but the sequence number of the target temperature point is updated once per second until the downward trend of temperature is inverted, and the inverted sequence number of the target temperature point is recorded at this time. A temperature value of a sequence number point corresponding to the inverted sequence number is taken as the point A', a target temperature value corresponding to a sequence number point taken forwards by 1.5-2.5 times of the sequence number point of the point A' is taken as the point B', and a temperature difference value of the points B' and A' is calculated. An average temperature difference value ΔT' is obtained by dividing the temperature difference value of the points B' and A' by a total number of interval segments of sequence number points between the points B' and A', that is, dividing the temperature difference value of the points B' and A' by a difference value of a sequence number corresponding to the point B' and a sequence number corresponding to the point A'. Then, the temperature value of the point A' is taken as the starting point to gradually increase the average temperature difference value ΔT' one by one according to the time interval of one second, so that a new subdivided temperature trajectory is obtained, and then the new subdivided series of target temperatures are input into the PID controller as the set values for trajectory tracking, so as to recover the deviated actual trajectory.

The above description is only a preferred embodiment of the disclosure, but the scope of protection of the disclosure is not limited thereto, and any change or substitution that can be easily conceived by those skilled in the art within the technical scope disclosed in the disclosure shall be included in the scope of protection of the disclosure. Therefore, the scope of protection of the disclosure should be subject to the scope of protection of the appended claims.

What is claimed is:

1. A control method for temperature trajectory tracking, comprising:
   drawing a target temperature trajectory of a controlled object;
   performing discretization processing on the target temperature trajectory to obtain a discretized target temperature trajectory; and
   performing temperature trajectory control on the controlled object based on the discretized target temperature trajectory, comprising:
      taking a first point of the target temperature trajectory as a pre-heating temperature value or a pre-cooling temperature value, and starting the temperature trajectory control after a temperature of the controlled object reaches the pre-heating temperature value or the pre-cooling temperature value;
   wherein the performing discretization processing on the target temperature trajectory comprises:
      determining whether a time interval between adjacent target temperature points in the target temperature trajectory is greater than one second;
      dividing, in response to the time interval between the adjacent target temperature points in the target temperature trajectory being greater than one second, a connecting line between the adjacent target temperature points into n parts equally by taking one second as an interval, acquiring a temperature increment through equally dividing a temperature difference value between the adjacent target temperature points into the n parts, and obtaining n numbers of target temperature values based on a starting point temperature of the connecting line between the adjacent target temperature points with a difference of each adjacent two target temperature values of the n numbers of target temperature values being the temperature increment, thereby completing discrete subdivision of the connecting line between the adjacent target temperature points; and
      performing the discrete subdivision on all the adjacent target temperature points in the target temperature trajectory, thereby completing the discretization processing of the target temperature trajectory;
   wherein the performing temperature trajectory control further comprises:
      acquiring an actual temperature trajectory of the controlled object, and processing the actual temperature trajectory when the actual temperature trajectory deviates from the discretized target temperature trajectory, then replacing the target temperature trajectory with the processed actual temperature trajectory;

wherein the processing the actual temperature trajectory comprises:

after the actual temperature trajectory deviates from the discretized target temperature trajectory, acquiring a transition temperature point when the actual temperature trajectory recovers a same trend as the target temperature trajectory, and acquiring a temperature difference value within a preset threshold range based on the transition temperature point;

wherein the preset threshold range is a range from a time sequence number of the transition temperature point to one of time sequence numbers taken 1.5 to 2.5 times of the time sequence number of the transition temperature point, and the time sequence number is one of abscissa sequence numbers sequentially marked when the n numbers of target temperature values are increased in one-by-one manner by the time interval of one second in the discretized target temperature trajectory;

acquiring, based on the temperature difference value within the preset threshold range, an average temperature difference value of temperature points varying in one-by-one manner by the time interval of one second within the preset threshold range;

adding the average temperature difference value to temperature values of the temperature points in one-by-one manner by the time interval of one second based on the transition temperature point to thereby obtain the processed actual temperature trajectory; and operating a proportional-integral-derivative (PID) control program, based on the target temperature trajectory, to cnotrol temperature trajectory.

2. The control method according to claim 1, wherein the drawing a target temperature trajectory comprises:
acquiring the target temperature points, and connecting the target temperature points to draw the target temperature trajectory.

3. A control system for temperature trajectory tracking, implementing the control method according to claim 1, comprising: a controller, a servo fan, a heating wire, a platinum resistance sensor, the controlled object, and a preset temperature trajectory processor;
wherein the preset temperature trajectory processor is configured to draw the target temperature trajectory;
wherein the controlled object is a cavity for characterizing an actual temperature;
wherein the platinum resistance sensor is configured to detect the actual temperature of the controlled object and input the actual temperature to the controller; and
wherein the controller is configured to control, based on the actual temperature, a wind speed of the servo fan and a power output of the heating wire, draw the actual temperature trajectory based on the actual temperature, perform discretization processing on the target temperature trajectory, and operate a proportional-integral-derivative (PID) control program thereby completing temperature trajectory control.

4. The control system according to claim 3, wherein parameters of the PID control program are obtained by self-tuning by a relay feedback method; and
wherein the parameters of the PID control program comprise a proportional coefficient Gain, an integral time Ti, a derivative time Td.

* * * * *